United States Patent [19]

Smith et al.

[11] 4,232,777
[45] Nov. 11, 1980

[54] PAN INVERTING APPARATUS AND METHOD

[75] Inventors: Jimmie L. Smith, Plano; John D. Honeycutt, McKinney; Michael J. Dobie, Lewisville, all of Tex.

[73] Assignee: Stewart Engineering & Equipment Company, Richardson, Tex.

[21] Appl. No.: 939,652

[22] Filed: Sep. 5, 1978

[51] Int. Cl.³ ............................................. B65G 47/24
[52] U.S. Cl. ................................. 198/404; 198/412; 198/466; 198/579
[58] Field of Search ............... 198/404, 412, 466, 469, 198/470, 480, 575, 577, 579, 690, 803; 271/186, 187

[56] References Cited

U.S. PATENT DOCUMENTS

| | | | |
|---|---|---|---|
| 1,954,278 | 4/1934 | Adams | 198/466 |
| 2,501,224 | 3/1950 | Kadell | 198/404 |
| 2,565,779 | 8/1951 | Muddiman | 198/404 |
| 2,692,670 | 10/1954 | Lescallette | 198/404 |
| 2,732,057 | 1/1956 | Temple | 198/404 X |
| 2,790,533 | 4/1957 | Osgood | 198/404 |
| 3,081,863 | 3/1963 | Monohan | 198/466 |
| 3,108,677 | 10/1963 | Temple | 198/575 X |
| 3,403,768 | 10/1968 | Tobey et al. | 198/404 |
| 3,452,856 | 7/1969 | Brittain | 198/466 |
| 3,795,301 | 3/1974 | Sugitani | 198/404 |

*Primary Examiner*—James L. Rowland
*Attorney, Agent, or Firm*—Richards, Harris & Medlock

[57] ABSTRACT

A pan inverting apparatus comprises an input endless belt and an output endless belt, between which a revolving pan wheel is positioned. The pan wheel includes a plurality of transverse pan receivers opening radially outward to define the circumference thereof. Each pan to be inverted is guided into engagement with the input endless belt and against a movable stop. The stop is synchronized with rotation of the pan wheel to selectively release each pan for chambering into one of the pan receivers for rotation by the pan wheel. After approximately one-half revolution of the pan wheel, the inverted pans are individually engaged by the output endless belt for advancement out of the pan receivers. In the preferred embodiment, cushioning within the pan receivers helps to secure the pans and reduce noise. Preferably, magnets are located subjacent to the input and output endless belts to promote positive frictional engagement with the pans.

21 Claims, 5 Drawing Figures

PAN INVERTING APPARATUS AND METHOD

BACKGROUND AND SUMMARY OF THE INVENTION

The present invention relates generally to a device and method for turning pans or trays upside down. More particularly, the invention relates to a novel pan inverting apparatus for use in conjunction with conventional pan conveying systems without affecting the speed of the overall pan handling operation.

Frequently, in the operation of a modern automated industry large numbers of trays of different types are utilized on a production line, and consequently must be handled quickly and efficiently. After leaving the production line, the trays are typically cleaned and/or refilled before being returned to the production line. For example, in a modern automated bakery large numbers of various sizes and types of pans must be handled. Depending upon the type of product to be baked, the pans must be moved onto and off of the baking line as rapidly as possible. It is desirable to store the pans upside down in stacks to reduce stacking damage, as well as to prevent dust accumulation. After removal from storage and prior to utilization, the pans are unstacked and must be turned right side up to receive the baking dough. It will be appreciated that significant amounts of time can be lost each time the pans are turned over. Consequently there is a need for an efficient means for inverting pans or trays.

While the function of inverting pans can obviously be undertaken manually, mechanical pan inverters capable of performing this function are known. However, the mechanical pan inverters of the prior art have involved several disadvantages. Primarily, the pan inverters of the prior art are characterized by noisy and slow operation. The slowdown at the pan inverter causes the additional drawback of adversely affecting the speed of the rest of the pan handling operation. Moreover, many of the prior art pan inverters are only able to handle pans of one size, or at most in a narrow size range. Furthermore some of the prior art pan inverters are not readily compatible with some conventional pan conveying systems. Heretofore, there has not been available a relatively quiet pan inverting apparatus which is capable of use with a wide range of pan types and sizes without diminishing the speed of the entire pan handling operation.

The present invention comprises a pan inverting apparatus which overcomes the foregoing and other difficulties associated with the prior art. In accordance with the broader aspects of the invention, a pan inverting apparatus includes a revolving pan wheel having a plurality of pan receivers opening radially outward to define the periphery thereof. The pans are serially fed into the revolving pan wheel, rotated approximately one-half revolution, and then advanced out of the pan wheel in an inverted orientation. The pan inverting apparatus of the invention is particularly suited for placement in a path or stream of conveyed pans without requiring a reduction in speed of the overall pan conveying system. Moreover, the pan inversion is accomplished within acceptable noise levels.

In accordance with more specific aspects of the invention, a pan inverting apparatus is provided for insertion in a path of moving pans without slowing down the overall rate of pan movement. The apparatus can be used in conjunction with a wide range of sizes and types of pans. The pan inverting apparatus incorporates input and output conveyors for advancing each pan into and out of, respectively, a rotating pan wheel at rates of speed relatively greater than the original rate of pan conveyance. Mounted between the input and output conveyors, the pan wheel comprises a plurality of pan receivers opening radially outward about the circumference. The pan receivers include cushioning material for noise abatement, and are uniquely configured to accept, retain and release the pans during rotation.

Pans approaching the pan inverting apparatus are guided into engagement with the input conveyor and a movable pan stop. The pan stop is synchronized with the rotating pan wheel to selectively release each pan for chambering into a pan receiver. A timing wheel secured to the pan wheel together with a sensing device is utilized for synchronism between the pan stop and the pan wheel. A portion of each pan protrudes after chambering into the pan wheel, which then carries each pan through approximately one-half revolution. The output conveyor then engages the protruding portion of each pan to withdraw the inverted pans from the pan wheel. Preferably, a plurality of magnets are employed to frictionally engage the pans for positive advancement by the conveyors.

DESCRIPTION OF THE DRAWINGS

A more complete understanding of the invention can be had by reference to the following Detailed Description when taken in conjunction with the accompanying Drawings, wherein.

DETAILED DESCRIPTION

Figure 1:
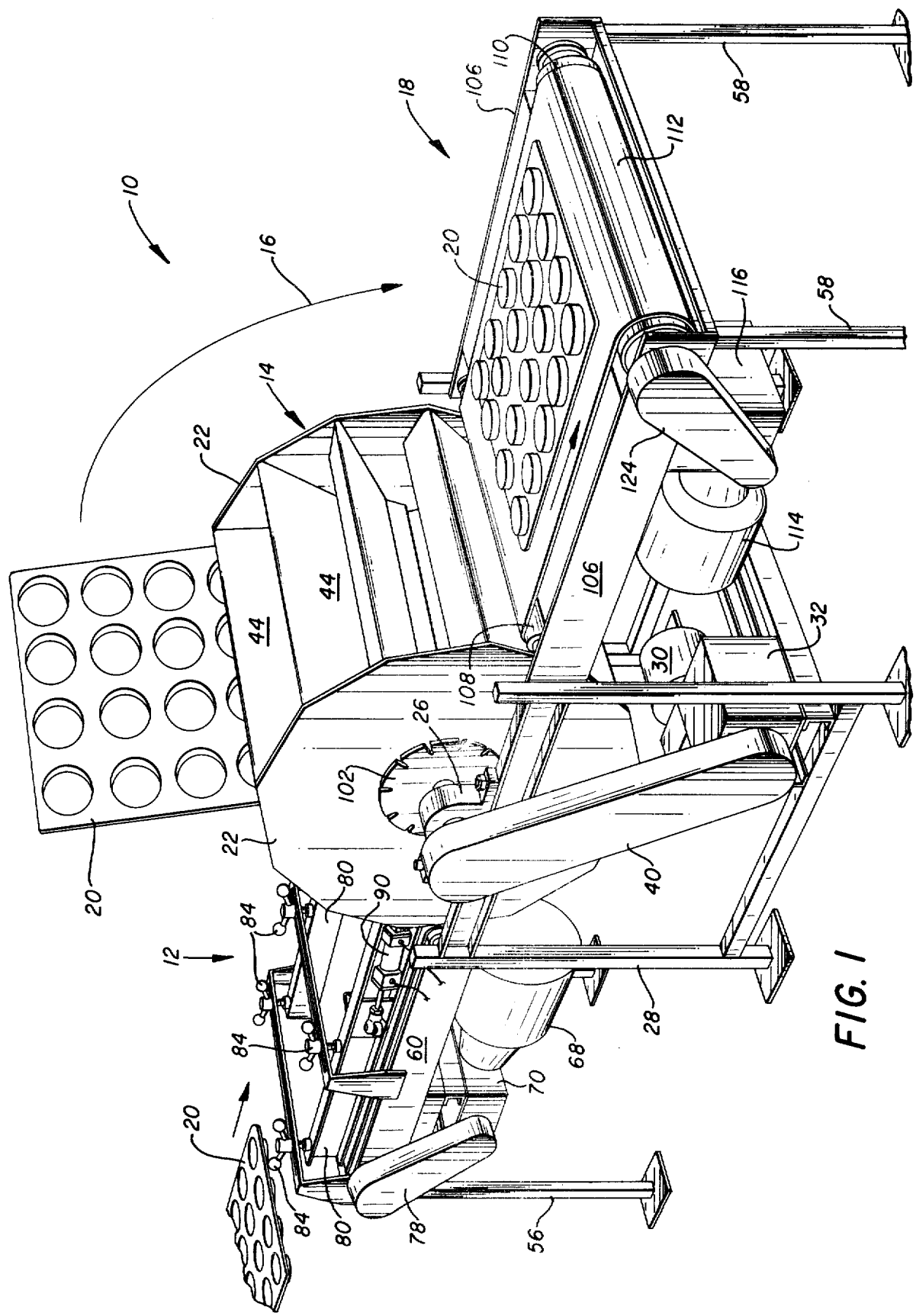
FIG. 1 is a perspective view of a pan inverting apparatus incorporating the invention.

Referring now to the Drawings wherein like reference characters designate like or similar components throughout the several views, and particularly referring to FIG. 1, there is shown a pan inverting apparatus 10 incorporating the invention. The pan inverting apparatus 10 comprises an input conveyor 12, a pan wheel 14 revolving in the direction indicated by arrow 16, and an output conveyor 18. Apparatus 10 is particularly suited for use in conjunction with conventional pan or tray handling systems without any reduction in the overall speed of the system. Apparatus 10 efficiently accomplishes inversion of pans 20 within acceptable noise levels. The invention can be used to turn over pans which are initially right side up or upside down. Although the pans 20 shown in FIG. 1 are of the bun type, it will be understood that apparatus 10 can be utilized with a wide range of various types and sizes of pans, trays, and the like.

Figure 2:
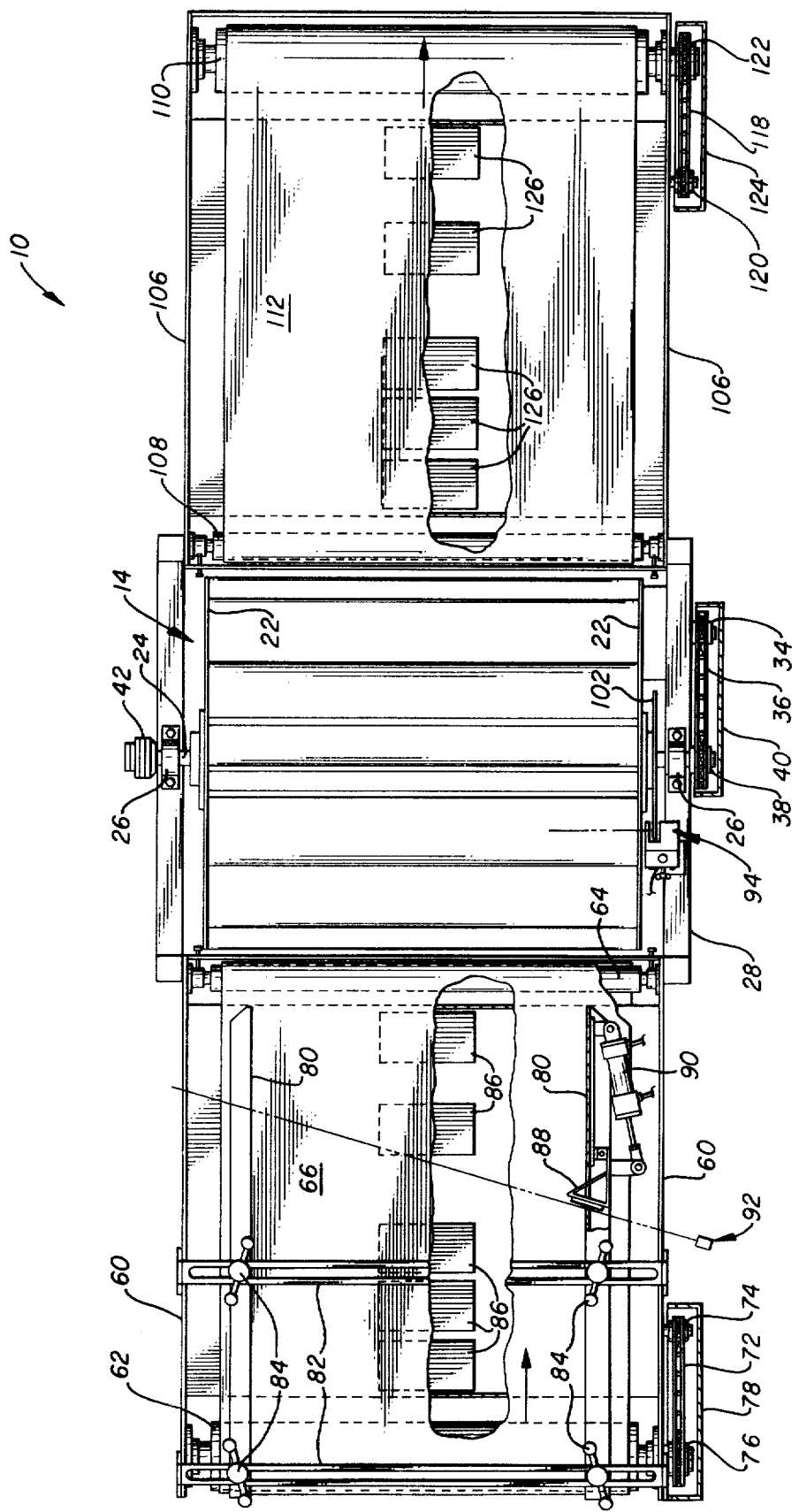
FIG. 2 is a plan view of the apparatus shown in FIG. 1.
Figure 3:
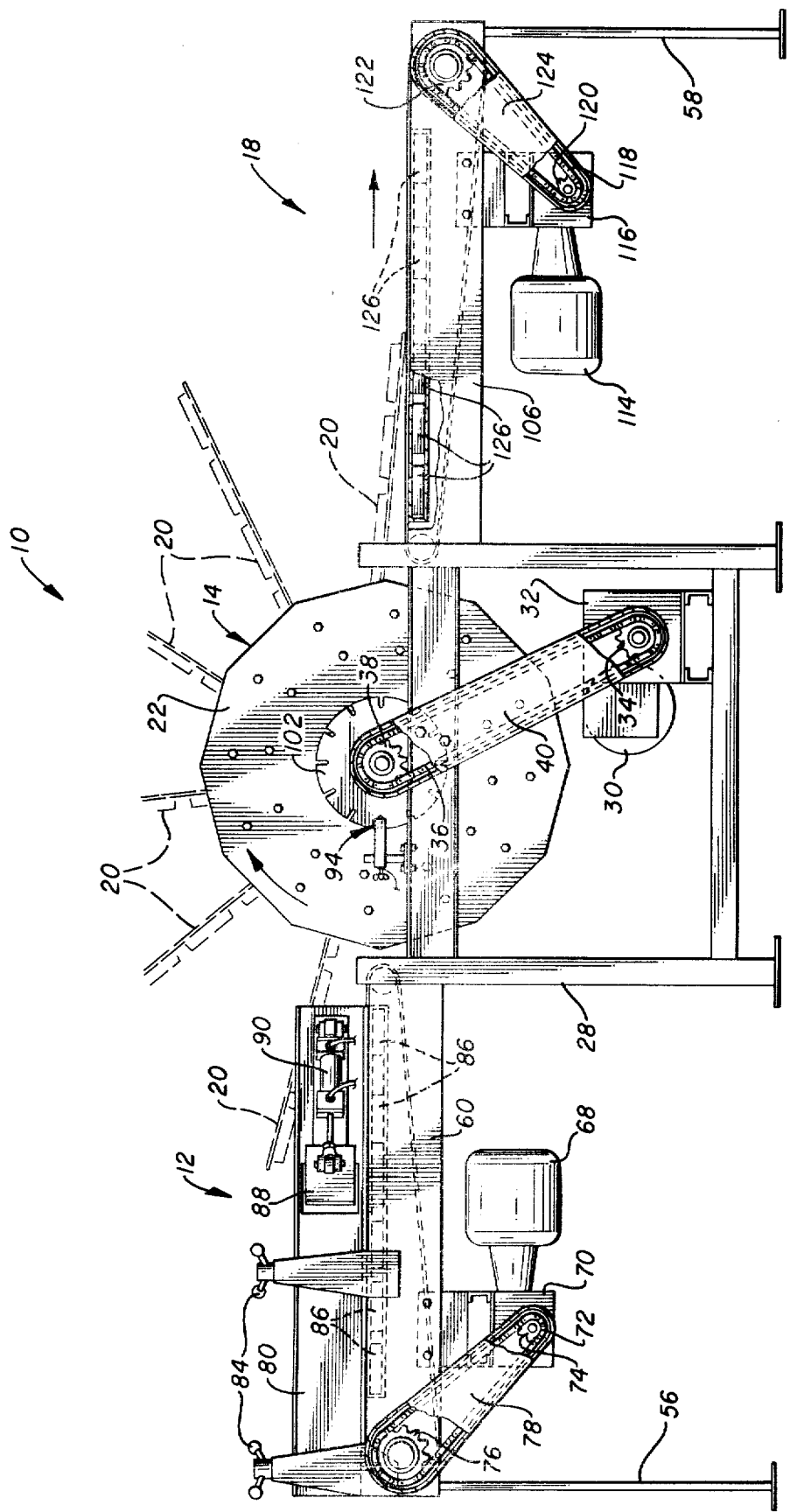
FIG. 3 is a side elevational view of the apparatus shown in FIG. 1.

Referring now to FIGS. 2 and 3, there is shown the pan wheel 14. The pan wheel 14 includes a pair of side plates 22 secured in spaced relationship to shaft 24. The shaft 24 in turn is journaled for rotation between bearings 26 mounted on frame 28. The frame 28 is of conventional design and comprises four upstanding legs interconnected with lateral brace members. The pan wheel 14 is thus mounted for rotation on frame 28.

Rotation of the pan wheel 14 is effected by motor 30 through speed reducer 32, both of which are secured to frame 28 as is shown best in FIG. 3. The drive sprocket 34 is affixed to the output shaft of speed reducer 32. Preferably, a torque limiter is connected between speed reducer 32 and sprocket 34 to prevent injury to equipment or personnel should the pan wheel 14 become obstructed. Chain 36 is constrained about drive sprocket 34 and sprocket 38, which is attached to shaft 24. The pan wheel 14 is thus rotated by motor 30 through speed reducer 32 and a chain and sprocket arrangement. Motor 30 is preferably of the constant speed type developing approximately one-half horsepower. In the preferred construction, an enclosure 40 is provided around chain 36 and sprockets 34 and 38 for safety purposes. It will be understood that when apparatus 10 is in operation, the pan wheel 14 is revolving continuously at a predetermined rate of rotation. In actual practice, the pan wheel 14 turns at approximately 4 rpm. Additionally, a brake 42, which is best shown in FIG. 2, is also secured to shaft 24 to selectively arrest rotation of the pan wheel 14.

Figure 4:
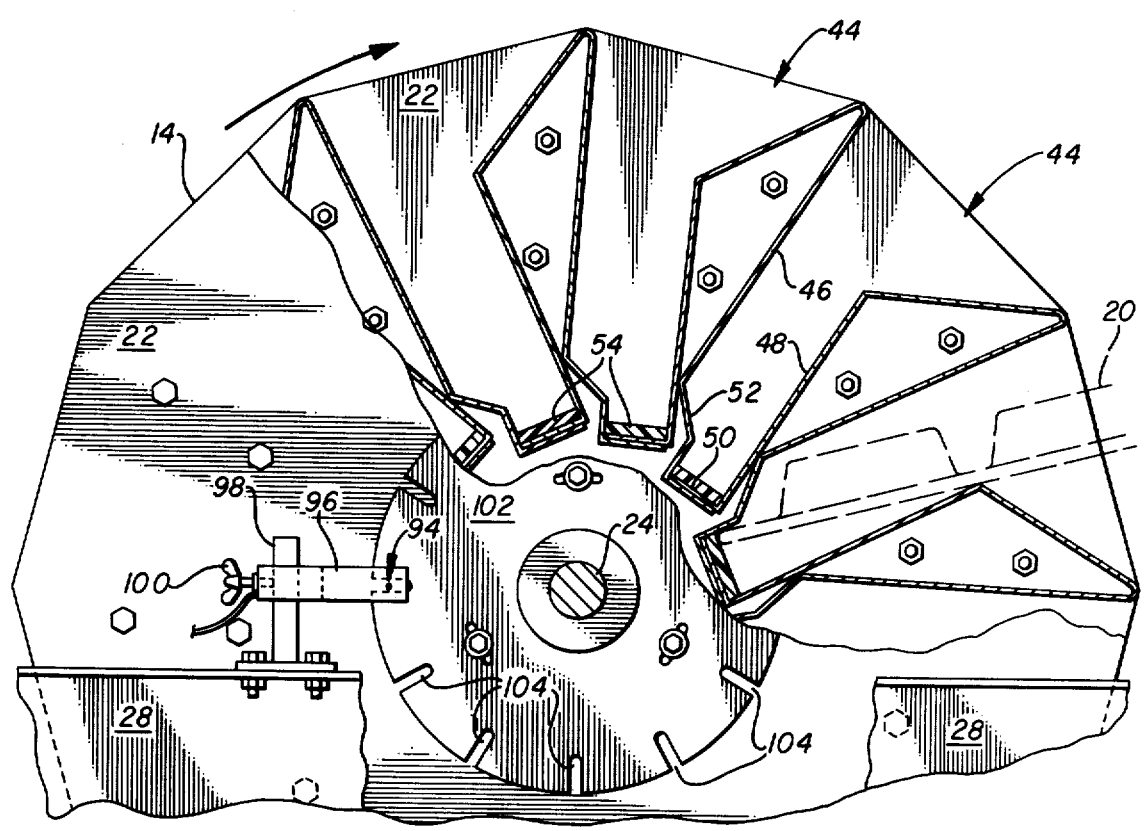
FIG. 4 is a partial side view of the pan wheel utilized in the invention in which certain parts have been broken away to illustrate more clearly certain features of the invention.

Referring primarily to FIG. 4, the pan wheel 14 includes a plurality of pan receivers 44 each for carrying a pan 20 through a preselected rotational portion of pan wheel 14. Opening radially outward, the pan receivers extend between side plates 22 at evenly spaced intervals thereabout. In the preferred construction, twelve pan receivers 44 are utilized in the pan wheel 14. The pan receivers 44 are of unique, novel configuration so as to enable a wide range of various types and sizes of pans or trays to be received. Each pan receiver 44 includes a pair of main walls 46 and 48 in predetermined spaced relationship. The first main wall 46 extends outwardly in substantially straight fashion to the periphery of the pan wheel 14. The second main wall 48 extends for a predetermined distance outwardly and parallel to the first main wall 46, and then angles away from first wall 46 in substantially straight fashion until intersecting the periphery of the pan wheel 14. It will thus be apparent that the entrance to each pan receiver 44 is relatively taller than the interior thereof. As shown in FIG. 4, the pan wheel 14 rotates in a clockwise direction. The outer portions of walls 48 therefore diverge from walls 46 toward the direction of rotation of pan wheel 14. The inside ends of main walls 46 and 48 are joined by end walls 50 and 52 to close the interior of each pan receiver 44. End wall 50 extends substantially orthogonal to main wall 48 toward main wall 46. End wall 52 angled as shown in FIG. 4 interconnects end wall 50 and main wall 46. In the preferred embodiment, a layer of cushioning 54 is provided on the inside surface of wall 50 of each pan receiver 44 to aid in the retention of pans 20, as well as for noise abatement purposes. Preferably, cushioning 54 comprises a resilient material such as elastomeric material.

It will be understood that above-described configuration of pan receivers 44 together with the use of cushioning and sound deadening filler 54 therein comprises a significant feature of the present invention. This design enables a wide variety of pans, trays, and the like to be positively chambered in and engaged by pan receivers 44 at greatly reduced noise levels. This in turn allows apparatus 10 to invert pans 20 relatively quietly. In actual practice pan turnover rates of up to approximately 50 pans per minute have been achieved with pans ranging in size from about 18-36 inches in length, about 8-34 inches in width, and about ½-2½ inches in depth.

With reference again to FIGS. 2 and 3, there is shown input conveyor 12 and output conveyor 18 which function to advance pans 20 into and out of, respectively, the pan wheel 14. The input conveyor 12 is substantially horizontal and extends to a point adjacent to one side of the pan wheel 14. The output conveyor 18 extends from a point adjacent to the pan wheel 14 opposite conveyor 12, and is also substantially horizontal. Preferably, the proximal ends of conveyors 12 and 18 are pivotally secured to frame 28, while the distal ends thereof are supported by uprights 56 and 58, respectively. Preferably, uprights 56 and 58 are of selectively extendible construction so that the exact heights of the distal ends of conveyors 12 and 18 can be individually adjusted if necessary. Thus, it will be appreciated that pan inverting apparatus 10 can be adapted for use with virtually any conventional pan conveying system.

The input conveyor 12 receives the pans 20 to be inverted, and selectively advances each of said pans into one of the pan receivers 44 in the pan wheel 14. Conveyor 12 includes a pair of side frames 60 between which drive roller 62 and idler roller 64 are mounted for rotation. The endless belt 66 is constrained for rotation around rollers 62 and 64. The conveyor 12 is driven by motor 68 which is coupled to speed reducer 70. Chain 72 is constrained about drive sprocket 74 attached to the output shaft of speed reducer 70 and sprocket 76 affixed to the shaft of drive roller 62. A cover 78 encloses chain 72 and sprockets 74 and 76 for safety purposes. Motor 68 is preferably of the constant speed type developing approximately one-half horsepower. The endless belt 66 is continuously driven by motor 68 at a speed relatively greater than the speed of the conveying system with which apparatus 10 is being used. In particular, pans 20 received by conveyor 12 are advanced at a linear rate of approximately 1.3 times the linear pan speed of the overall pan handling system. It will be understood that the relatively quicker advancement of pans 20 by conveyor 12 is a contributing factor in enabling apparatus 10 to effect inversion without any slowdown in the speed of the overall system.

The pans 20 to be inverted are received on the input conveyor 12 between a pair of guides 80. Each guide 80 is supported from slotted cross members 82 extending above and across endless belt 66. The cross members 82 in turn are affixed to side frames 60. Preferably, each guide 80 is mounted for sliding movement in cross members 82 and clampingly secured thereto by means of handles 84 so that various sizes of pans, trays and the like can be properly aligned prior to chambering in the pan wheel 14. To enhance the frictional engagement between the pans 20 and conveyor 12, a plurality of magnets 86 are arranged in a central line beneath the upper course of endless belt 66. As is perhaps best shown in FIG. 2, magnets 86 are positioned in closer relative relationship near the input end of the conveyor 12. Of course, depending upon the type of pans or trays being inverted, it may not always be necessary to utilize magnets 86.

The pans 20 received by conveyor 12 are first advanced into engagement with movable pan stop 88. The pan stop 88 is mounted on one of the guides 80 for pivotal movement into and out of the path of pans 20.

Double acting cylinder 90 selectively actuates stop 88. The double acting cylinder 90 is preferably of the pneumatic variety.

Referring again to FIG. 4 in conjunction now with FIGS. 2 and 3, cylinder 90 which actuates stop 88 is controlled by photosensors 92 and 94. The photosensor 92 projects a beam in front of stop 88 and diagonally across endless belt 66. It will thus be apparent that interruption of the beam of photosensor 92 signals the presence of a pan or tray positioned for chambering in the pan wheel 14. However, photosensor 94 is also checked before stop 88 is opened.

Figure 5:
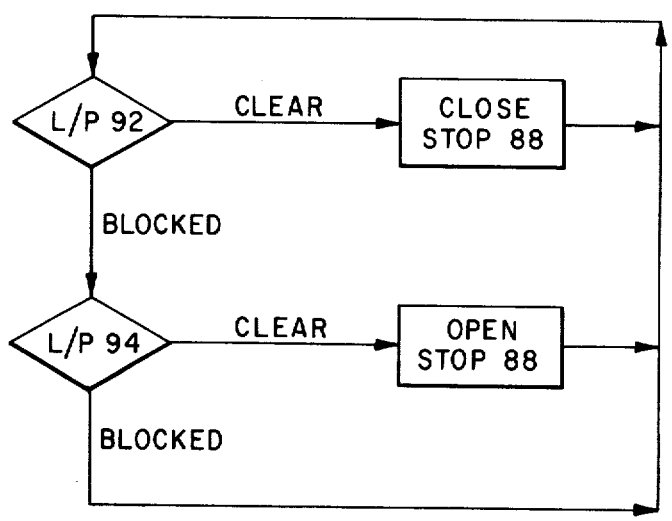
FIG. 5 is a schematic illustration of the control logic utilized by the pan inverting apparatus of FIG. 1.

As is best shown in FIG. 4, photosensor 94 projects a beam across the gap of slotted member 96. The member 96 is adjustably secured to post 98 by means of thumb screw 100. Preferably, the post 98 is secured to the frame 28 a predetermined distance from the axis of the pan wheel 14 so that member 96 can be adjusted along a line perpendicular to said axis. Member 96 and post 98 are positioned on frame 28 so that timing wheel 102, which is mounted for rotation with the pan wheel 14, passes through the gap of member 96. The timing wheel 102 includes a plurality of peripheral slots 104, each corresponding to one of the pan receivers 44. It will thus be apparent that the clearing of the beam for the photosensor 94 corresponds to a predetermined positioning of a pan receiver 44 as the pan wheel 14 rotates. By this means, synchronism between pan wheel 14 and input conveyor 12 is achieved. Consequently, when photosensor 92 is blocked and photosensor 94 is clear, stop 88 is opened to release a pan 20 for chambering in the pan wheel 14. Fine adjustment between the pan wheel 14 and conveyor 12 is easily accomplished by the vertical readjustment only of member 96 on post 98. The control logic for stop 88 is schematically illustrated in FIG. 5.

After insertion in the pan wheel 14, pans 20 are carried through approximately one-half revolution and engaged in an inverted orientation by the output conveyor 18. The conveyor 18 is of similar construction to that of conveyor 12. The output conveyor 18 includes a pair of side frames 106, between which idler roller 108 and drive roller 110 are mounted for rotation as is best shown in FIG. 2. Endless belt 112 is constrained around rollers 108 and 110. The output conveyor 18 is driven by motor 114 through speed reducer 116. Motor 114 is preferably of the constant speed type developing approximately one-half horsepower. The chain 118 is constrained about the drive sprocket 120 attached to the output of speed reducer 116 and sprocket 122 affixed to the shaft of drive roller 110. A cover 124 encloses chain 118 and sprockets 120 and 122 for reasons of safety.

As the pans 20 in the revolving pan wheel 14 come around, the protruding edges of said pans come into engagement with endless belt 112. As is best illustrated in FIG. 2, a plurality of magnets 126 arranged in a central line beneath the upper course of endless belt 112 are employed to enhance the frictional contact between belt 112 and each pan 20. The inverted pans 20 are thus positively engaged with the output conveyor 18 and advanced out of pan receivers 44 without interrupting the rotation of pan wheel 14. It will be appreciated that the configuration of the pan receivers 44, including the widened entrance featuring a wall portion diverging away from the direction of rotation, facilitates the removal of pans 20 from the pan wheel 14. Similar to input conveyor 12, the output conveyor 18 moves at a linear speed relatively greater than the speed of the overall system by a factor of approximately 1.3. The conveyor 18 thus advances each inverted pan 20 out of the revolving pan wheel 14 and returns said pans to the original stream with no loss of time.

From the foregoing, it will be understood that the present invention comprises an apparatus and method for inverting pans, trays, and the like which incorporates numerous advantages over the prior art. The invention features a continuously revolving pan wheel in operative relationship with input and output conveyors. A wide variety of pans can be handled. Of particular significance is the fact that the pan inversion is automatically accomplished at diminished noise levels and without any reduction in speed of the rest of the pan handling system. Other advantages attending the use of the invention will readily suggest themselves to those skilled in the art.

Although particular embodiments of the invention have been illustrated in the accompanying Drawings and described in the foregoing Detailed Description, it will be understood that the invention is not limited to the embodiments disclosed, but is intended to embrace any alternatives, modifications, and rearrangements and substitutions of parts or elements as fall within the spirit and scope of the invention.

What is claimed is:

1. Apparatus for inverting pans, trays or the like, comprising:
revolving pan wheel means including structure defining a plurality of pan receivers;
input means comprising endless belt means mounted for rotation about a course including a portion adjacent to one side of the revolving pan wheel means and responsive to rotation of the pan wheel means for engaging and selectively advancing a pan to be inverted into one of said pan receivers for rotation therewith through approximately a one-half revolution to effect inversion;
output means for engaging and advancing inverted pans out of the pan wheel means;
a pair of pan guide members mounted in spaced relationship above said endless belt;
sensing means for detecting the presence of a pan between said guide members and a predetermined rotational position of the pan wheel means; and
pan stop means extending into the path of motion of a pan on the endless belt means between said guide members to stop the pan and responsive to said sensing means to move out of said path of motion to permit advancement by the endless belt means of a pan received between said guide members into one of the pan receivers of the revolving pan wheel means.

2. The pan inverting apparatus according to claim 1 further including a plurality of magnets mounted along a central line subjacent to the endless belt means for magnetically urging the pans into positive engagement with said belt means.

3. The pan inverting apparatus of claim 1 wherein the output means comprises an endless belt means positioned opposite the input means and mounted for rotation about a course including a portion adjacent to the pan wheel means.

4. The pan inverting apparatus according to claim 3 further including a plurality of magnets mounted along a central line subjacent to the last mentioned endless belt means for magnetically urging the pans into positive engagement with said last mentioned endless belt means.

5. The pan inverting apparatus of claim 1 wherein the pan wheel means comprises:
   a shaft mounted for rotation;
   a pair of side plates secured in spaced relation to said shaft; and
   structure extending between said side plates and defining a plurality of pan receivers opening radially outward about the periphery thereof.

6. The pan inverting apparatus according to claim 3 wherein each of said pan receivers within the pan wheel means includes a layer of resilient material secured to at least a portion of the interior surfaces thereof.

7. Apparatus for inverting pans, trays or the like, which comprises:
   an input endless belt for engaging pans to be inverted;
   a revolving pan wheel located at the discharge end of said input endless belt and including a plurality of structures defining pan receivers opening radially outward to define the periphery of said pan wheel;
   each of said pan receivers including a substantially straight bottom wall, a top wall having an inner portion parallel to and spaced from said bottom wall and an outer portion extending away from said bottom wall to define a widened entrance to the pan receiver, and an end wall interconnecting the inner ends of said top and bottom walls;
   pan stop means positioned adjacent the input endless belt and synchronized with rotation of the pan wheel for selectively releasing each pan for advancement by said belt into one of the pan receivers for rotation with the pan wheel to effect inversion; and
   an output endless belt mounted adjacent the pan wheel and opposite the input endless belt for engaging and advancing inverted trays from the pan wheel.

8. The pan inverting apparatus of claim 7, further including a plurality of magnets positioned in a central line beneath the input and output endless belts for effecting positive engagement between said belts and the pans.

9. The pan inverting apparatus of claim 7 wherein a layer of resilient material is secured to the interior surfaces of the end wall of each pan receiver.

10. The pan inverting apparatus of claim 7 wherein the apparatus is interposed in a path of pans moving at an original rate of travel, and wherein the input and output endless belts are moving at predetermined linear rates greater than the original rate of pan travel.

11. The pan inverting apparatus to claim 10 wherein said input and output endless belts are each moving at a linear rate of speed an approximate 1.3 multiple of the original rate of pan travel.

12. Apparatus for inverting pans, trays or the like, which comprises:
   an input endless belt for engaging pans to be inverted;
   revolving pan wheel located at the discharge end of said input endless belt and including a plurality of structures defining pan receivers opening radially outward to define the periphery of said pan wheel;
   each of said pan receivers including a substantially straight bottom wall, a top wall having an inner portion parallel to and spaced from said bottom wall and an outer portion extending away from said bottom wall to define a widened entrance to the pan receiver, and an end wall interconnecting the inner ends of said top and bottom walls;
   pan stop means positioned adjacent the input endless belt and synchronized with rotation of the pan wheel for selectively releasing each pan for advancement by said belt into one of the pan receivers for rotation with the pan wheel to effect inversion;
   an output endless belt mounted adjacent the pan wheel and opposite the input endless belt for engaging and advancing inverted trays from the pan wheel;
   a pair of pan guide members mounted in adjustably spaced relationship above said input endless belt;
   first photosensor means for detecting a pan positioned against said pan stop means for advancement into the revolving pan wheel;
   a timing wheel mounted for rotation with the pan wheel and including a plurality of slots therein each corresponding to one pan receiver; and
   second photosensor means mounted in cooperative relationship with said timing wheel for sensing a predetermined rotational position of each pan receiver in the pan wheel;
   said pan stop means being responsive to both the first and second photosensor means.

13. The pan inverting apparatus according to claim 12 wherein the second photosensor means is adjustably supported along a line offset and perpendicular to the rotational axis of said pan wheel.

14. For placement in a path of pans moving at an original rate of pan conveyance, apparatus for inverting pans, which comprises:
   a pan wheel mounted for rotation about a substantially horizontal axis;
   means for effecting a predetermined rate of rotation of said pan wheel;
   said pan wheel comprising a pair of spaced apart side members and a plurality of structures defining pan receivers extending between said side plates and opening radially outward to define the periphery of the pan wheel;
   each of said pan receivers being defined by a first surface extending inwardly from the periphery of the pan wheel, a second surface having an outer portion converging inwardly away from the direction of pan wheel rotation and an inner portion spaced and parallel to the first surface, a third surface extending perpendicularly from the inner end of the second surface toward the first surface, a fourth surface extending outwardly from the end of the third surface, and a fifth surface sloping outwardly in the direction of pan wheel rotation and connecting the fourth surface with the inner end of the first surface;
   a timing wheel mounted for rotation with the pan wheel;
   said timing wheel including a plurality of spaced, radially arranged slots each corresponding to a pan receiver;
   an input conveyor for receiving and advancing pans to be inverted toward the pan wheel;
   pan stop means located along the input conveyor for selectively halting advancement of pans by the input conveyor;
   first photosensor means for sensing the presence of a pan in engagement with the pan stop means;

second photosensor means in association with the timing wheel for sensing a predetermined rotational position of each pan receiver;

said pan stop means being responsive to the first and second photosensor means to release pans for chambering into the pan wheel so that said pans are rotated to effect inversion; and an output conveyor for engaging and advancing inverted trays out of said pan receivers;

said input and output conveyors having linear rates of speed a predetermined factor greater than the original pan conveyance rate.

15. The pan inverting apparatus of claim 14 further including a plurality of magnets positioned centrally along a line beneath the input and output conveyors for effecting positive engagement between said conveyors and the pans.

16. The pan inverting apparatus of claim 14 further including a pair of pan guide members adjustably secured in spaced relationship above the input conveyor.

17. The pan inverting apparatus of claim 14 wherein said second photosensor is adjustably supported along a line offset and perpendicular to the rotational axis of said pan wheel.

18. Apparatus for inverting pans, trays or the like, comprising:

revolving pan wheel means including structures defining a plurality of pan receivers;

input means responsive to rotation of the pan wheel means for engaging and selectively advancing a pan to be inverted into one of said pan receivers for rotation therewith through approximately a one-half revolution to effect inversion; and output means for engaging and advancing inverted pans out of the pan wheel means;

wherein the pan wheel means comprises:
a shaft mounted for rotation;
a pair of side plates secured in spaced relation to said shaft;
structure extending between said side plates and defining a plurality of pan receivers opening radially outward about the periphery thereof;
each of said pan receivers includes a pair of main walls; and
one of said main walls has an inner portion substantially parallel to the other of said main walls and an outer portion diverging away from said other main wall, said divergent outer portion being a top wall when adjacent said input means and a bottom wall when adjacent said output means.

19. Apparatus for inverting pans, trays or the like, comprising:

revolving pan wheel means including structures defining a plurality of pan receivers;

input means responsive to rotation of the pan wheel means for engaging and selectively advancing a pan to be inverted into one of said pan receivers for rotation therewith through approximately a one-half revolution to effect inversion; and output means for engaging and advancing inverted pans out of the pan wheel means;

wherein the pan wheel means comprises:
a shaft mounted for rotation;
a pair of side plates secured in spaced relation to said shaft;
structure extending between said side plates and defining a plurality of pan receivers opening radially outward about the periphery thereof; and
a layer of cushioning provided on the inside surface of each of said pan receivers to aid in the retention of pans and to abate noise.

20. The invention according to claim 19 wherein each of said pan receivers includes a pair of main walls in predetermined spaced relationship joined at their inside ends by an end wall, and wherein said layer of cushioning is provided on the inside surface of said end wall.

21. The invention according to claim 20 wherein one of said main walls has an inner portion substantially parallel to the other of said main walls and an outer portion extending away from said other main wall, and wherein said end wall is substantially orthogonal to said inner portion of said one main wall and to said other main wall.

* * * * *